United States Patent [19]
Cochran

[11] Patent Number: 5,735,194
[45] Date of Patent: Apr. 7, 1998

[54] APPARATUS FOR SEPARATING CHAFF AND ROASTING COFFEE AND COCOA BEANS

[76] Inventor: David M. Cochran, 851 Tulare St., Pismo Beach, Calif. 93449

[21] Appl. No.: 778,696

[22] Filed: Jan. 3, 1997

[51] Int. Cl.⁶ .............................. A47J 37/00; A23N 12/12
[52] U.S. Cl. .............................. 99/483; 34/371; 34/591; 99/323.5; 99/469; 99/474
[58] Field of Search .............. 99/286, 323.5–323.11, 99/469, 470, 473–476, 483; 34/359, 360, 371, 376, 586, 591; 55/DIG. 34; 209/127.1, 127.2, 129; 95/59, 61; 96/17

[56] References Cited

U.S. PATENT DOCUMENTS

| | | | |
|---|---|---|---|
| 2,172,603 | 9/1939 | Adams et al. | 99/469 |
| 4,325,191 | 4/1982 | Kumagai et al. | 99/286 |
| 4,484,064 | 11/1984 | Murray | 99/474 |
| 4,631,838 | 12/1986 | Eichler et al. | 34/665 |
| 4,698,916 | 10/1987 | Farber | 34/591 |
| 5,269,072 | 12/1993 | Waligorski | 34/594 |
| 5,359,788 | 11/1994 | Gell, Jr. | 99/285 |
| 5,394,788 | 3/1995 | Sewell | 34/544 |
| 5,481,962 | 1/1996 | Tedesco | 99/323.4 |
| 5,500,237 | 3/1996 | Gell, Jr. et al. | 99/483 X |
| 5,564,331 | 10/1996 | Song | 99/469 |
| 5,609,097 | 3/1997 | Newnan | 99/470 |
| 5,638,607 | 6/1997 | Lemme et al. | 99/323.4 |

Primary Examiner—Timothy F. Simone
Attorney, Agent, or Firm—Coudert Brothers

[57] ABSTRACT

An improved apparatus for separating chaff from coffee and cocoa beans is designed for use in combination with either the hot air blowing base of the common household consumer appliance, the electrical popcorn popper or the larger volume coffee roasters. The apparatus comprises a hopper having an open top, an open bottom mountable over the hot air blowing base of the popper for roasting beans, at least one exhaust gas outlet, a transparent or translucent lid for covering the top and allowing the user to observe the color of the roasting beans and a screen mounted over the exhaust gas outlet. The screen is coated with a material that causes its surface to become electrostatically charged during the bean roasting process. In addition, a protective outer coating is deposited to completely cover the dielectric material to prevent this material from being destructively removed or electrochemically altered by the chemicals in cleaners for the lid. The chaff from the beans becomes separated during the roasting process and then is entrained in the exhaust gases which pass upward from the hot air blowing base for roasting the beans and through the open bottom. The chaff is collected on the electrostatically charged screen and is easily removed after the roasting process.

37 Claims, 4 Drawing Sheets

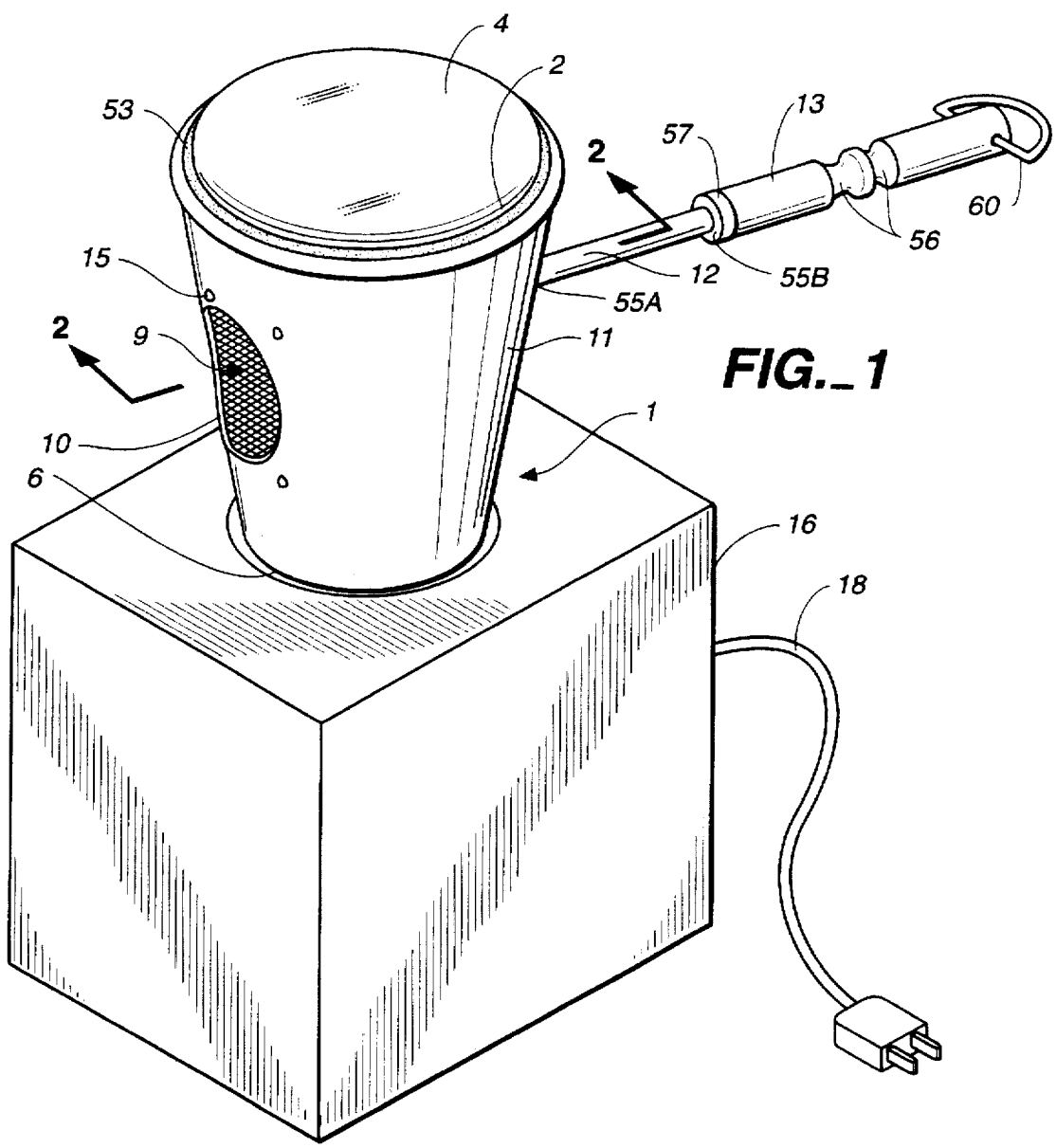
FIG._1

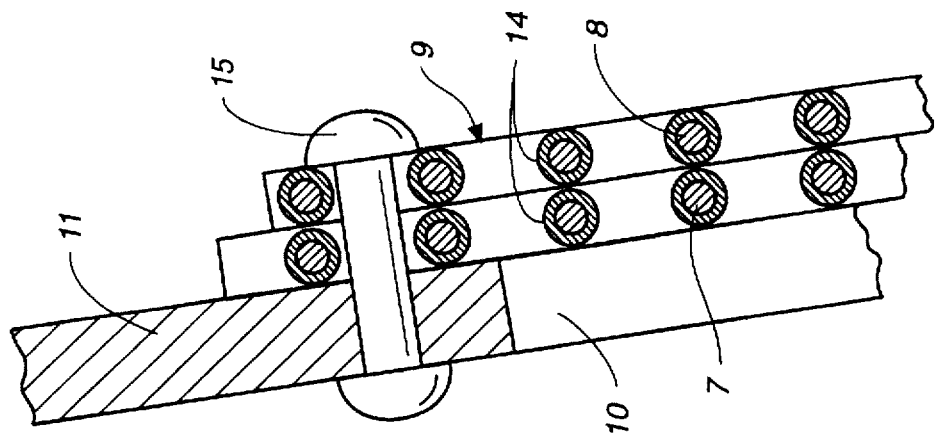
FIG._3
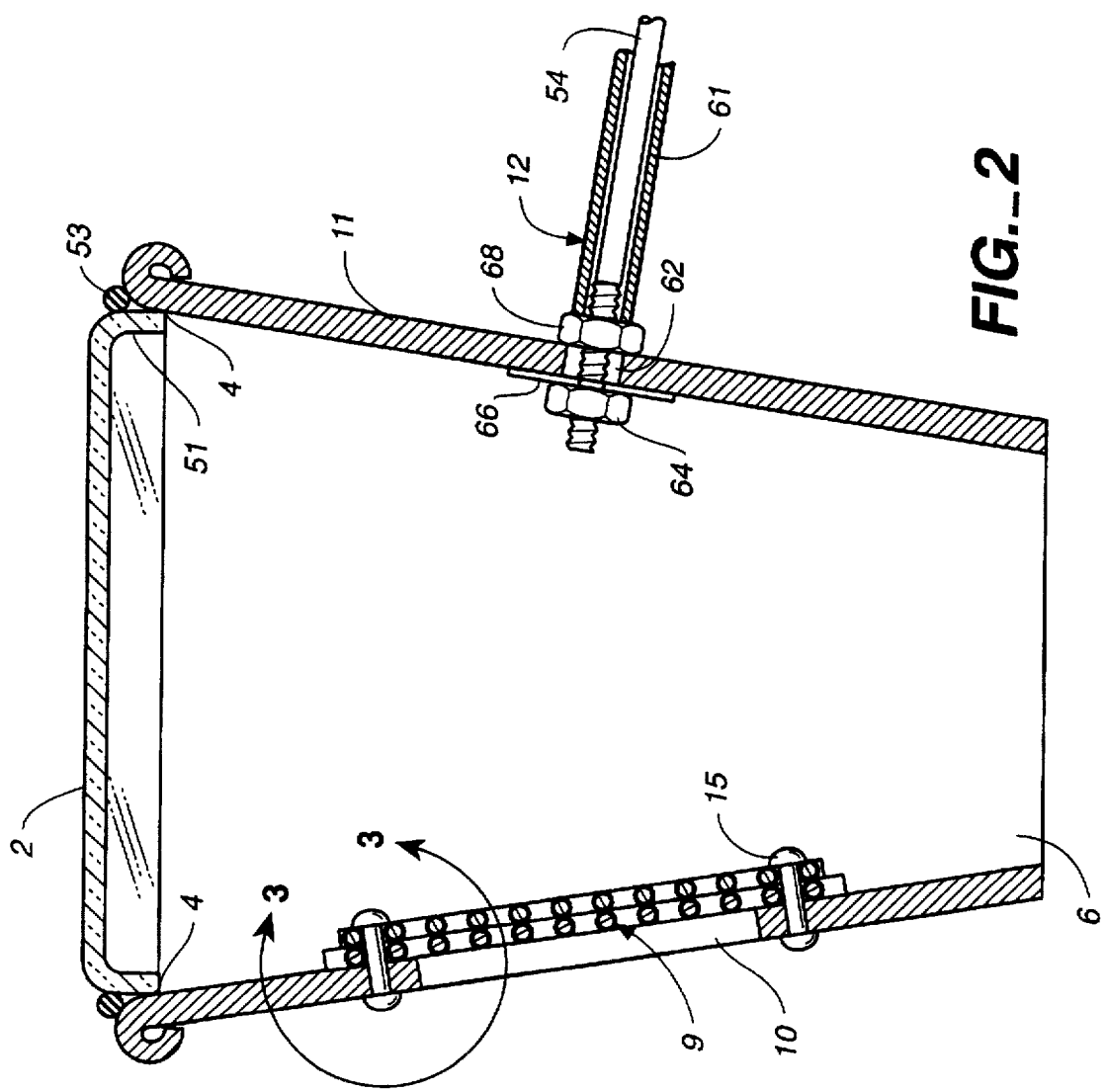
FIG._2

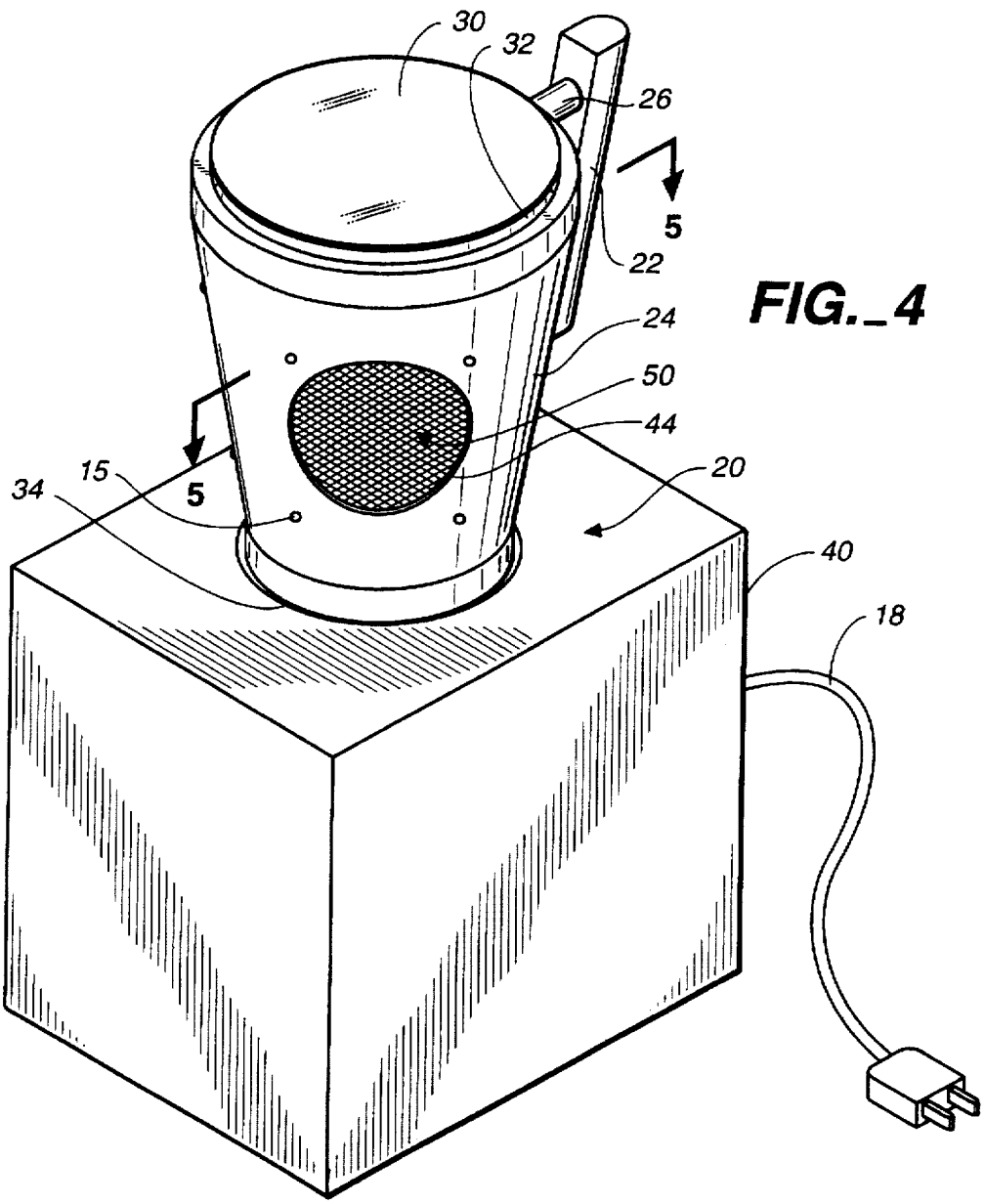
FIG._4
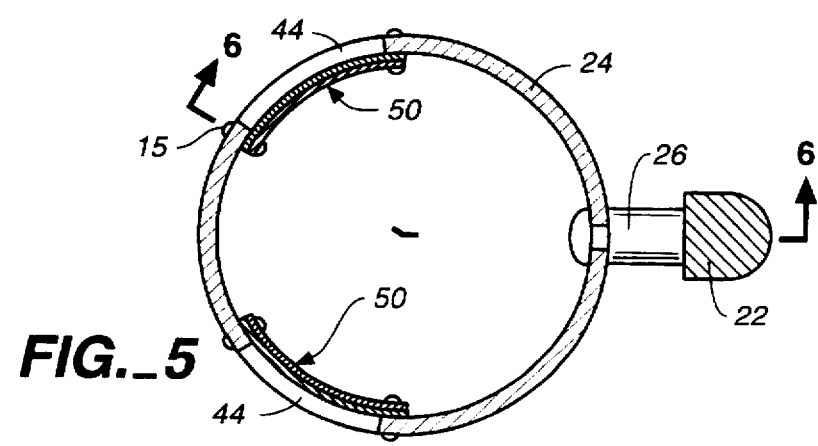
FIG._5

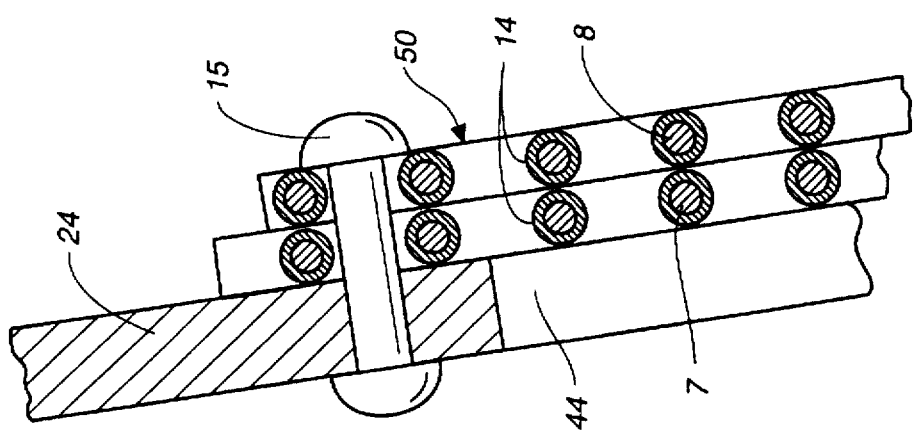
FIG._7
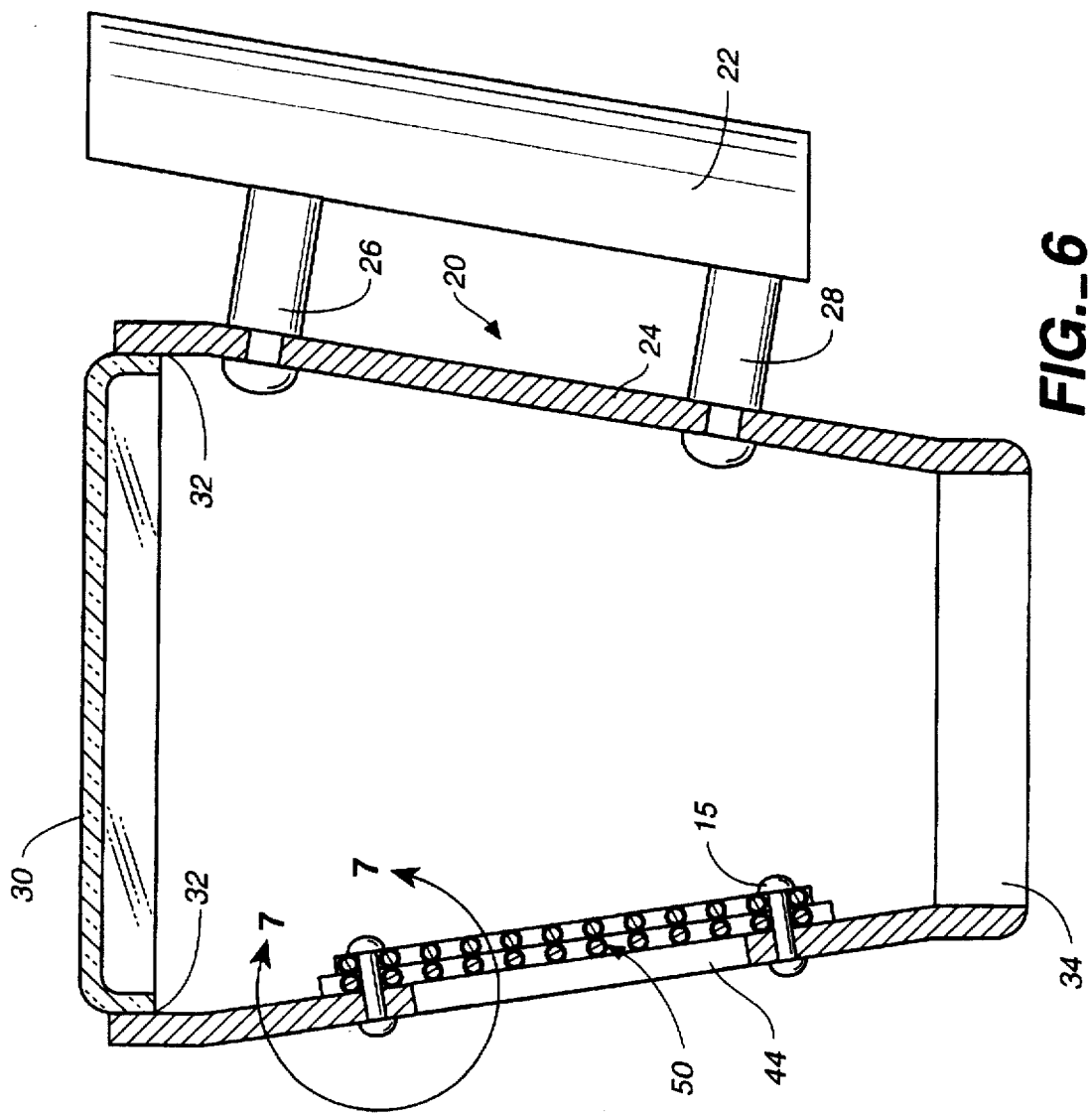
FIG._6

APPARATUS FOR SEPARATING CHAFF AND ROASTING COFFEE AND COCOA BEANS

FIELD OF THE INVENTION

This invention relates generally to the field of roasting coffee and cocoa beans. Specifically, this invention relates to an improvement in a device and method for separating the chaff and removing the chaff from coffee or cocoa beans while the beans are being roasted as disclosed and claimed in U.S. Pat. No. 5,355,783, issued Oct. 18, 1994, by David M. Cochran, the inventor of the present invention.

BACKGROUND OF THE INVENTION

The chaff separating device of the '783 patent, the pertinent portions of which are incorporated by reference herein, is designed for use in combination with the hot air blowing base of the common household consumer appliance, the electrical popcorn popper, to serve as the bean roaster. The device of the '783 patent contains a specially treated screen over the exhaust gas outlet. Specifically, the screen is coated with a mixture of materials to cause the surface of the screen to become electrostatically charged during the bean roasting process. The chaff that becomes separated from the beans during the roasting process is entrained in the exhaust gases and is collected on the electrostatically charged screen. After the chaff separating device had been introduced into the market, some users found the screen was no longer able to maintain the electrostatic charge. This problem was noted with users that repeatedly cleaned the device after each roasting batch using the low alcohol glass cleaners currently being sold to meet stricter environmental controls. After from about three to five roasting batches, the chaff did not adhere to the screen to enable the user to easily separate the chaff by shaking the device over a waste receptacle. It is theorized that the window cleaners commonly found on the market after 1995 contain electrical conductive chemicals which become absorbed by the bi-polar dielectric materials used to coat the screen. The resulting combination of chemicals from the cleaner and the dielectric material are slowly removed by the high heat, i.e. temperatures of above about 400° F. generated by the bean roasters.

SUMMARY OF THE INVENTION

The apparatus of the present invention solves the problem of the slow removal of the dielectric material from the screen used to separate and collect the chaff that comes off the coffee or cocoa beans during the roasting, re-roasting or refreshing of the beans. Both the improved apparatus and the apparatus of the '783 patent are designed to be combined with air heating and hot air blowing means for roasting the beans. Such bean roasters that are used in electrical popcorn poppers are finding widespread acceptance in households and small commercial establishments. The roaster consists of a base housing, a cup for the beans of coffee, cocoa, mixtures of coffee and cocoa or popcorn having hot air vents around the bottom and/or around the periphery of the bottom of the cup within the housing, an electric motor and a blower mounted within the housing. The blower moves air over red-hot electric heating coils and blows the resulting air at a temperature of about 350° to about 450° F. through the hot air vents and into the cup. In addition, the chaff separating device of the present invention is also designed to be combined with the large volume, e.g., up to about 20 pounds, coffee roasters.

The improved chaff separating apparatus of the present invention, also designated as a Chaff Collector Adapter, comprises a hopper having an open top an open bottom and at least one exhaust gas outlet. The bottom fits over the top of or down into the cup or base, generally metal, of the bean roaster. A lid, preferably a translucent or transparent lid, covers the open top. A screen is mounted over the exhaust gas outlet or over each of the outlets if the apparatus has more than one outlet. The screen of the Chaff Collector Adapter is specially treated with a dielectric material to collect and remove the chaff from the exhaust gases escaping from the apparatus during the bean roasting process. In addition, a protective outer coating is deposited to completely cover the dielectric material to prevent this material from being either electrochemically altered or destructively removed by the chemicals in the cleaners used to clean the lid and other parts of the Adapter.

Specifically, the screen of the present invention is first coated with a mixture of materials designed to hold the chaff by means of a self-generating electrostatic positive to negative charge molecular attraction and is then coated with at least one protective coating of a resin. Because of the high temperatures used in the roasting process, the resin must have sufficient thermal stability to withstand temperatures of at least 600° F., preferably temperatures of about 1200° F. The electrostatic attraction develops on the screen as the hot exhaust gases pass over the coated surface of the screen during the bean roasting process. In other words, the screen becomes electrostatically charged during the roasting process because of the dielectric mixture of materials upon its surface. The chaff that becomes separated from the beans during the roasting process is entrained in the exhaust gases. The exhaust gases then pass upward from the bean roasting mechanism through the open bottom and are collected on the electrostatically charged screen. After the beans are roasted, the hopper is easily removed from the roasting mechanism with tongs, a hot pad or preferably by means of a handle attached to the hopper. A slotted handle is preferred to allow the handle to be vertically adjusted and the hopper to be balanced on some smaller new models of hot air popcorn poppers (mainly West Bend). The chaff strongly adheres to the screen until it has sufficiently cooled or until the hopper is shaken to dislodge the chaff from the screen into a waste receptacle.

In a preferred embodiment of the improved Chaff Collector Adapter, the lid comprises a heat resistant material, selected from the group consisting of translucent glass, transparent glass, translucent plastic and transparent plastic, to enable the user to monitor the bean roasting progress by the color of the beans. Glass cleaners used to clean the Adapter and primarily the inside of the lid do not penetrate the protective coating of resin completely covering the electrostatically charged screen. Consequently, the dielectric material covering the screen does not become absorbed by the chemicals of the glass cleaners and slowly lost during each use and cleaning. It has been surprisingly found that the protective layer is effective to prevent such penetration of cleaning chemicals without adversely affecting the ability of the screen to separate and collect the chaff for long periods of use.

BRIEF DESCRIPTION OF THE DRAWINGS

FIG. 1 is an isometric view of one embodiment of the apparatus of the present invention;

FIG. 2 is a cross-sectional view of the embodiment of the present invention taken along line 2—2 shown in FIG. 1;

FIG. 3 is a detailed, partly cross-sectional view of the embodiment of the present invention taken along line 3—3 shown in FIG. 2;

FIG. 4 is an isometric view of another embodiment of the apparatus of the present invention having a beer stein type of handle and two exhaust ports;

FIG. 5 is a view of a vertical cross-section of the embodiment of the present invention taken along line 5—5 shown in FIG. 4;

FIG. 6 is a cross-sectional view of the embodiment of the present invention taken along line 6—6 shown in FIG. 5;

FIG. 7 is a detailed, partly cross-sectional view of the embodiment of the present invention taken along line 7—7 shown in FIG. 6;.

DETAILED DESCRIPTION OF THE PREFERRED EMBODIMENT

Preferably, the screen of the Chaff Collector Adapter of this invention comprises a copper-zinc alloy, e.g. brass, screen having a mesh in the range of about 5 to about 200, preferably about 10 (openings of about 1/16 inch) to about 35 (openings of about 1/64 inch). It has been found that such a screen develops a slight positive electrostatic charge during the roasting process. The light, oily chaff develops a negative charge and will have a slight tendency to stick to the screen. However, the resulting electrostatic force between the screen and the chaff is insufficient to cause a significant amount of the chaff to adhere to the screen during the roasting process. Consequently, the chaff will fall into the cup or other storage container of the bean roaster and contact the hot beans. The chaff can sometimes become ignited and cause a flash fire within the storage container.

Understanding the electrostatic phenomenon is essential to understanding the function of the Chaff Collector Adapter. Initially, the brass screen has a natural negative charge when connected to ground. During the roasting process, the brass screen develops a semiconductor copper oxide film on its surface that imparts a slight positive charge to the screen. This results in a positive and negative junction or a P & N junction, as it is commonly referred to in semiconductor engineering. To achieve a stronger P & N junction and hence a stronger electrostatic charge on the exhaust gas screen requires coating the screen with a dielectric mixture of materials. The dielectric mixture comprises a polar active compound that is stable at high temperatures, a polar compound that acts as a spacer for the polar active compound and an adhesive that causes the mixture to permanently adhere to the surface of the screen. The dielectric mixture is placed into a slurry with a suitable carrier such as an alcohol or a solvent such as acetone or ether that will evaporate without an appreciable residue. The slurry of the mixture is applied to the screen by applying the slurry with a brush or dipping the screen into the slurry. The coated screen is then dried. The result after this first coating step is a screen coated with a dielectric mixture exhibiting a sufficiently strong electrostatic, polarly active and insulating barrier. This barrier causes the chaff generated during roasting process to adhere to the coated surface of the screen.

The coated screen is then dabbed by a suitable brush or other applicator with a moderately thick second or protective coating of a high temperature, (preferably a temperature of about 1200° F.), very tough, dipolar resin. Preferably, this step is repeated two to five times to provide a plurality of thin protective coats. If more than five protective coats are applied or if the thickness of any coat is too great, the approximately 1/16 inch openings in the screen become clogged and the gases are prevented from exiting the Chaff Collector Adapter. It is also preferred that during the protective coating application, both the inside and outside surfaces as well as the surfaces in between of the exhaust and chaff collection screen are thoroughly covered with from one up to five coats of the high temperature resin.

An acceptable high temperature resin is available from VHT Corporation of Phoenix, Ariz. Preferably, the resin is clear, i.e., free of pigments which are conductive and would interfere with the dielectric. One example of the type of pigment that does not interfere with the dielectric and can be used is titanium dioxide. The protective coating of resin on the polar dielectric substantially eliminates the temporary destruction of and/or electrically altering the strong electrostatic charge that holds the chaff on the screen after the hot air pressure has stopped flowing during the roasting process. A suitable dipolar resin can be made by mixing a high quality silicone glue available from Dow Chemical Company with a suitable solvent, e.g., ether or acetone. The thickness of the silicone/solvent mixture is controlled by the amount of the silicone added.

The destruction of the electrostatic charge being held between the chaff and the grounding screen is caused by most of the EPA standard regulated glass cleaners since 1996. The EPA has required the elimination of alcohol from over-the-counter cleaning products. These new cleaners, with very low evaporative hydrocarbons, use agents that would contaminate the strong bipolar dielectric materials that are first applied to the screen of the Chaff Collector Adapter and cause the screen to become conductive. The latter has been found after about three to five batches of coffee or a total of about 12 to 20 ounces of coffee have been roasted with heating and cooling cycles of approximately 7 to 12 minutes each. After three to five heating and cooling cycles, it is believed the hot (ranging from about 350° to about 450° F.) gases have driven off these contaminates along with a portion of the polar active compounds that adsorb these contaminants.

The polar active compounds used to produce a strong P & N junction include titanium dioxide as well as powdered ceramics such as barium titanate and titanium aluminides. Titanium dioxide is preferred because it is low in cost, non-toxic and readily available.

The polar spacer compounds used in the dielectric mixture include silicates such as sodium silicate, calcium silicate, potassium silicate, calcium magnesium silicate, ferrous ammonium silicate, barium titanium silicate, hydrous magnesium silicate (talc), and mixtures thereof.

A suitable binder for the mixture is selected from any of the organosilicon oxide polymer resins commonly called silicone resins. The same resins used in the protective coating of the present invention can be used as a binder for the mixture.

The preferred mixture comprises between about 50 to about 85 parts by weight of the polar active compound, about 10 to about 50 parts by weight of a polar spacer compound and about 1 to about 30 parts by weight of a binder. For cosmetic reasons a non-toxic pigment may be added to the mixture in the amount of about 2 to 3 parts by weight. The latter additive as well as other additives can be added without greatly affecting the ability of the screen to hold the bean chaff for a safe period.

Preferably, the entire interior surface of hopper is first coated with a polar dielectric mixture containing titanium dioxide to make observation and light transmission during bean roasting easier. This flat, white coating is then coated with the clear high temperature protective resinous coating used as the outer coat on the screen. The final result is a glossy coating having an off-white or egg shell color which greatly helps light transmission and gives a good contrast for observing the color changes in the roasting coffee or cocoa beans.

The preferred screen assembly is a double screen comprising an outside screen having one face toward the exterior of the hopper and an inside screen having one face toward the interior of the hopper. The other face of the inside screen is flush with the other face of the outside screen. At least the inside screen is coated with the mixture of polar active compound, polar spacer compound and binder. Preferably, all of the exposed surfaces of the double screen are coated with the dielectric mixture. Finally all of the exposed surfaces of the inside screen, the outside screen and any surfaces between the inside and outside screens are coated with a protective coating of the resin.

The Chaff Collector Adapter shown in FIGS. 1-3 comprises truncated conical hopper 1, lid 2 fixedly attached to open top 4, open bottom 6, screen 7 and screen 8 abutted to form double screen 9, and exhaust gas outlet 10 on sidewall 11. Double screen 9 is attached to sidewall 11 by means of rivets 15 or other common fasteners to completely cover exhaust gas outlet 10. Handle 12 is fixedly attached at the midpoint of sidewall 11 between top 4 and bottom 6. Hopper 1, comprising a malleable metal such as brass, steel or the like, is placed in a suitable jig and the entire inner surface of hopper 1 including double screen 9 is then provided with coating 14 comprising the dielectric mixture and a protective coat. Hopper 1 can be color coated brass to provide a hopper of, for example, red, yellow and green. Lid 2 comprises a translucent or transparent material such as heat resistant plastic, e.g. polycarbonate, or glass. Alternatively, lid 2 can comprise the same metal as that of hopper 1. In that case, lid 2 contains a window of a translucent or transparent of sufficient size to allow observation of the beans as they are being roasted. FIG. 1 shows open bottom 6 of hopper 1 mounted over the heating and blowing mechanism 16 of a conventional electrical popcorn popper.

The Chaff Collector Adapter shown in FIGS. 1-3 is designed to be used with most hot air popcorn poppers that have been sold throughout North America, Europe and Australia. These popcorn poppers are being sold at an annual volume of 10-16 million units through various manufacturers. Examples of suitable popcorn poppers are manufactured by West Bend Company, Presto Corporation, Proctor Silex, Inc., WearEver Companies and Wiersilor Corporation. Tens of millions additional households contain older hot air popcorn poppers that can also be used with this coffee roaster chaff collector.

To accommodate the larger industrial coffee roasters that are now on the market, the embodiment of the present invention shown in FIGS. 4-7 is provided. In place of handle 12, truncated conical hopper 20 has beer stein-type handle 22 and attached to the handle along sidewall 24 by means of upper post 26 and lower post 28, above and below the center of gravity, respectively. Lid 30 is mounted over top 32 and comprises the same translucent or transparent material of lid 4 of the embodiment shown in FIGS. 1-3. Open bottom 34 of larger hopper 20 is mounted over the bean storage container of bean roaster 40. An example of a bean roaster now available on the market is the Sivetz Roasting Machine that can roast up to 20 pounds of coffee. The Sivetz Roasting Machine uses a fluidized bed that parallels most of the small hot air popcorn poppers referred to above. Because of the much greater volume of chaff from the beans roasted in roaster 40, two exhaust gas outlets 44 are on sidewall 24. To maintain symmetry, the centers of outlets 44 are preferably positioned 120 degrees apart and handle 22 is positioned on sidewall 24 120 degrees from each of the centers of outlets 44 as shown in FIG. 5. Outlets 44 are completely covered by double screens 50, comprising screens 7 and 8, and coating 14 in the same manner as described above.

It is apparent that hopper 20 can be designed to roast smaller volumes of beans, about ¾ cup, up to the large volumes associated with the Sivetz Machine. For the smaller volumes, hopper 20 has only one exhaust gas outlet 44 oriented as shown in FIG. 1. To accommodate the increased amount of chaff from even larger volumes of beans, more than two outlets can be used.

EXAMPLES

Example 1

Truncated conical hopper 1 made of a polished brass, sold under the tradename Golden Polished Brass, had a height from top to bottom of about 6 inches, a thickness of about 0.039 inch (0.01 cm), open top 4 with a diameter of about 4 inches, open bottom 6 with a diameter of about 2⅜ inches, and exhaust gas outlet 10 with a diameter of about 2 inches. The center of outlet 10 was located on sidewall 11 half way between top 4 and bottom 6. Translucent heat resistant glass (Pyrex®) petri dish with an inside diameter of 4 inches and a thickness of about ⅛ inch and having sidewall 51 with a thickness of about ½ inch was inverted and fixedly attached over open top 4 to form lid 2. Specifically, lid 2 was attached by means of about 0.3 inch round bead 53 at top 4 between sidewall 14 and curled sidewall 11 and sealed with a heat resistant FDA silicone adhesive capable of withstanding temperatures above 400° F. Handle 12 consisting of slightly tapered steel shaft 54 having a mean cross-sectional diameter of about ¼ inch and a total length of approximately 5.9 inches (15 cm.) was mounted at first end 55A to sidewall 11 of hopper 1 as described in detail below. Grip 13 consisting of a tapered, dark hardwood had a diameter ranging from approximately ¾ inch (2 cm.) to ½ inch (1¼ cm.) and a length of about 5.11 inches (15 cm.). Grip 13 was mounted to steel shaft 54 by applying a wood to metal adhesive to approximately 1.57 (4 cm.) of second end 55B of steel shaft 54 and inserting the adhesive coated end 55B into wood grip 13 as shown in FIG. 1. In place of the hardwood, grip 13 can be made of any suitable material which has a sufficiently low heat of conductivity. Wood grip 13 contained two grooves 56 to easily accommodate the user's fingers. Brass ferrule 57 of about 0.2 inch (½ cm.) to about 0.3 inch (¾ cm) of polished brass was at end 55B and a hole of about 0.1 inch (¼ cm.) in diameter was drilled through grip 13 approximately ½ inch (1¼ cm.) from the end of grip 13. Brass ring 60 was placed through the hole, flattened on the side penetrating grip 13. Brass ring 60 was approximately 1.2 inch (3 cm.) in diameter for storing on a kitchen hook and the like. Polished brass tube 61 extended over steel shaft 54 approximately ⅛ inch in diameter and about 4½ inches long. End 55A of shaft 54 was mounted to sidewall 11 through slot 62. Slot 62 had a length and depth of about 0.39 inch (1 cm) to allow for an adjustment of the height of handle 12 above open bottom 6 when the hopper was placed over the heating and blowing mechanism 16 of a typical popcorn popper. Such an adjustment was necessary to assure that handle 12 did not interfere with the walls of the open cup holding the beans to be roasted in the popper. Steel nut 64 on the inside of slot 62 held polished washer 66 in place to more than cover slot 62. Polished brass washer 68 on the outside of slot 62 held tension on brass tube 61 and wooden grip 13. Handle 12 was positioned 180° from the center of exhaust gas outlet 10. It can be positioned within a range of about 90° to 270° from the center of outlet 10.

Two polished brass 20–25 mesh U.S. Tyler standard screens, approximately 3½ inches on each side, were placed back to back to form double screen 9. Double screen 9 was then fixedly attached to sidewall 11 by means of rivets 15 to completely cover the 2½ inch diameter exhaust gas outlet 10. The Chaff Collector Adapter was placed in a jig for the coating process. An off-white, polar dielectric slurry was formed comprising approximately 90 parts by weight of titanium dioxide, 10 parts by weight calcium magnesium silicate and 6 parts by weight of a high temperature (1200° C.) silicone resin in an excess of acetone as the carrier. The silicone resin was purchased by VHT Corporation. This off-white slurry was sprayed so that the flow of the spray was into open bottom 6 and out through exhaust outlet 10 with transparent lid 2 masked off. The spray was continued until the entire inner surface of hopper 1 including all exposed inner, outer and in between surfaces of double screen 9 were covered. The Adapter was allowed to dry. The dielectric slurry was dabbed by a brush onto the previously coated inner surface of screen 8 with a brush to produce a uniform dielectric coating. Handle 12, grip 1 and the entire exterior and interior surfaces of hopper 1, including the inside and outside surfaces of double screen 9 and all exposed surfaces in between the inside and outside surfaces, were then sprayed with the same clear, high temperature silicone resin used in and in the same manner as the dielectric slurry and allowed to dry. This step was repeated five times to assure that the entire exposed surfaces of hopper 1, including double screen 9, were completely covered with the protective coating while making sure the openings in the screens were not clogged. After the application of the off-white dielectric coating on the interior of hopper 1 had been coated with the 5 coats of the high temperature resin, the interior had a glossy white or egg shell appearance which greatly helped light transmission and gave a very good contrast during use as one observed the coffee beans turn from green to black.

The taper of hopper 1 was approximately 9° from vertical and provided a degree of gravitational force to the chaff that adhered to the surface of the screen during the roasting process. The design is a replica of a 14th century snuffer used to adjust the flames of large, ceremonial candles used in that day.

The popcorn holder (not shown) was removed from base housing 16 of a commercially available popcorn popper, Poppery II™ Electric Corn Popper, Cat. No 82000, 82001 sold by The West Bend Company, to expose an open metal cup (not shown) encased within housing 16. The hopper in combination with the popper can roast several ounces of green beans or re-freshen, pre-roasted coffee beans in a matter of minutes.

The metal cup with a length of 3½ inches and a diameter of 2¹¹⁄₁₆ inches had a number of hot air vents equally spaced around the periphery of (or from) its bottom to distribute the hot air evenly over the product being roasted or popped. In some of the poppers used with the Adapter, the hot air vents are equally spaced over the surface of the bottom. The portion of base housing 16 below the hot air vents contained the following elements (not shown except the electrical cord 18):

(1) a voltage dropping heating coil on one electrical circuit, (2) a major heating coil on another electrical circuit, (3) a thermostat, which had been adjusted so that the air temperature ranged from 400°–415° C. for optimum coffee roasting, which was electrically attached across the two heating coils, (4) AC or DC electrical power circuit connected to each of the heating coils through electrical cord 18, (5) an AC or a DC motor, (6) a rectifier connected between the electrical circuit and the DC motor, and (7) a blower attached to the AC or DC motor and positioned to blow air over the heating coils and out through the hot air vents.

Approximately ¾ of a cup of non-prewashed green coffee beans were placed into the metal cup of base housing 16 of the popper. Hopper 1 was placed onto housing 16 and positioned so that the 2¹¹⁄₁₆ inch rim of open bottom 6 was superimposed onto the outer rim of the metal cup. Electrical cord 18 was plugged into an AC outlet to begin the coffee bean roasting process. A beam of a flash light was directed through the translucent lid 4. The coffee beans were observed to turn from green to black, to expand and to crack twice during the roasting period of just a little over 5 minutes. Brown chaff was observed to fly off the coffee beans during the roasting process, to be carried upward with the exhaust gases and to substantially completely cover the coated face of double screen 9 facing the interior of hopper 1.

Handle 12 was held by means of wooden grip 13 and hopper 1 was removed from housing 16 after the approximately 5 minute roasting period and lightly tapped against a plate. This caused the chaff that had been tightly held to the inner face of double screen 8 to become easily released. Approximately ¼ cup of very loosely packed chaff was collected. Since the particular popper used in this example did not have a cold air input system, care was taken so that the coffee beans were not roasted beyond their optimum period. Therefore, the roasted beans completely free of chaff were removed from the metal cup during the first minute after the roasting period and placed in metal pans to cool. After cooling the beans to approximately room temperature, they were immediately ground and a portion of the freshly roasted and ground beans were brewed into a pot of very flavorful coffee.

Example 2

The large chaff collecting hopper 20 shown in FIG. 4 has a height of 18 inches, a thickness of ½ inch, open top 66 with a diameter of 14 inches, open bottom 34 with a diameter of 8 inches, and 2–2⅔ inch by 3 to 3½ inch exhaust outlets 44 (ovoids) to accommodate a greater volume of coffee chaff from large volume hot air roasting machinery 40. Beer stein-type of handle 22 of heat resistant material is attached to sidewall 24 by means of rivets or other fasteners through sidewall 24 into upper post 26 and lower post 28. Translucent heat resistant glass or polycarbonate having an inside diameter of 14 inches is used for lid 30. The same type of double screening used in Example 1 and that has been coated with the same type of coating 14 comprising the polar dielectric and the 1200° F. clear resin as a protective coating are used in hopper 20.

Further, without departing from the spirit and scope of this invention, one of ordinary skill in the art can make many other changes and modifications to the present invention to adapt it to specific usages and conditions. As such, these changes and modifications are properly, equitably, and intended to be, within the full range of equivalents of the following claims.

What is claimed is:

1. An apparatus for separating chaff from roasted beans selected from the group consisting of coffee, cocoa and mixtures thereof which comprises a hopper having an open top, an open bottom mountable over means for roasting beans and at least one exhaust gas outlet located on said hopper; a lid for covering the top; and a screen mounted over said exhaust gas outlet, said screen being coated with a mixture of materials that causes the surface of the screen to become electrostatically charged during the bean roasting process and at least one protective coating of a resin to cover the mixture of materials, the resin coating having sufficient thermal stability to withstand temperatures of at least 600° F., whereby the chaff that becomes separated from the beans during the roasting process is entrained in the exhaust gases which pass upward from said means for roasting beans and through the open bottom and is collected on the electrostatically charged screen.

2. The apparatus of claim 1 wherein a plurality of resin coatings are used to cover said mixture of materials.

3. The apparatus of claim 2 wherein said resin coatings are substantially transparent.

4. The apparatus of claim 1 wherein a plurality of exhaust gas outlets are located on said hopper and a screen covers each of said exhaust gas outlets.

5. The apparatus of claim 1 wherein a handle is attached to a sidewall of said hopper.

6. The apparatus of claim 5 wherein said handle is attached to said sidewall at two locations.

7. The apparatus of claim 1 wherein said screen comprises brass.

8. The apparatus of claim 6 wherein the mixture comprises a polar active compound, a polar spacer compound and a binder.

9. The apparatus of claim 8 wherein the polar active compound is selected from the group consisting of titanium dioxide, barium titanate, titanium aluminides, and mixtures thereof.

10. The apparatus of claim 8 wherein the polar spacer compound is selected from the group consisting of sodium silicate, calcium silicate, potassium silicate, calcium magnesium silicate, ferrous ammonium silicate, barium titanium silicate, hydrous magnesium silicate, and mixtures thereof.

11. The apparatus of claim 8 wherein the binder is a silicone resin.

12. The apparatus of claim 11 wherein the resin of said resin coating is a silicone resin.

13. The apparatus of claim 8 wherein the screen comprises brass and the mixture comprises between about 50 to about 90 parts by weight polar active compound, about 50 to about 10 parts by weight of polar spacer compound and about 1 to about 10 parts by weight of a binder.

14. The apparatus of claim 13 wherein the polar active compound is titanium dioxide.

15. The apparatus of claim 13 wherein the polar spacer compound is calcium magnesium silicate.

16. The apparatus of claim 5 wherein said hopper consists of a truncated conically shaped sidewall with the open bottom having a smaller cross-sectional diameter than that of the top.

17. The apparatus of claim 16 wherein a handle is attached to the sidewall between the top and the open bottom approximately at the center of gravity of said hopper.

18. The apparatus of claim 5 wherein said handle is attached to the sidewall between about 90° and about 270° from the center of said exhaust gas outlet.

19. The apparatus of claim 5 wherein said lid contains an observation window for monitoring the color of the beans during the roasting process.

20. The apparatus of claim 19 wherein the lid comprises a heat resistant material selected from the group consisting of translucent glass, transparent glass, translucent plastic and transparent plastic.

21. The apparatus of claim 5 wherein said screen is a double screen comprising an outside screen having one face toward the exterior of said hopper, an inside screen having one face toward the interior of said hopper and its other face flush with the other face of the outside screen, and wherein at least the inside screen is coated with the mixture of materials and at least one substantially transparent resin coating to cover the mixture of materials.

22. An apparatus for separating chaff from roasted beans selected from the group consisting of coffee, cocoa and mixtures thereof which comprises a hopper having a truncated conically shaped sidewall, an open top, an open bottom having a smaller cross-sectional diameter than that of the top and mountable over means for roasting beans and at least one exhaust gas outlet; a handle attached to the sidewall between the top and bottom; a lid mounted over the opening in the top of said hopper and having an observational window therein for monitoring the color of the beans during the roasting process; and a screen mounted over said exhaust gas outlet, said screen being coated with a mixture of materials that causes the surface of the screen to become electrostatically charged during the bean roasting process and at least one coating of a resin to cover the mixture of materials, whereby the chaff that becomes separated from the beans during the roasting process is entrained in the exhaust gases which pass upward from said means for roasting beans and through said open bottom and is collected on the electrostatically charged screen.

23. The apparatus of claim 22 wherein a plurality of resin coatings are used to cover said mixture of materials.

24. The apparatus of claim 21 wherein said resin coatings are substantially transparent.

25. The apparatus of claim 22 wherein a plurality of exhaust gas outlets are located on said hopper and a screen covers each of said exhaust gas outlets.

26. The apparatus of claim 22 wherein said handle is attached approximately at the center of said hopper.

27. The apparatus of claim 26 wherein said handle is attached to said sidewall at one location above and one location below the center of gravity of said hopper.

28. The apparatus of claim 22 wherein said screen comprises brass.

29. The apparatus of claim 22 wherein the mixture comprises a polar active compound, a polar spacer compound and a binder.

30. The apparatus of claim 29 wherein the polar active compound is selected from the group consisting of titanium dioxide, barium titanate, titanium aluminides, and mixtures thereof.

31. The apparatus of claim 29 wherein the polar spacer compound is selected from the group consisting of sodium silicate, calcium silicate, potassium silicate, calcium magnesium silicate, ferrous ammonium silicate, barium titanium silicate, hydrous magnesium silicate, and mixtures thereof.

32. The apparatus of claim 29 wherein the binder is a silicone resin.

33. The apparatus of claim 32 wherein the resin of said resin coating is a silicone resin.

34. The apparatus of claim 29 wherein the screen comprises brass and the mixture comprises between about 50 to about 90 parts by weight polar active compound, about 50 to about 10 parts by weight of polar spacer compound and about 1 to about 10 parts by weight of a binder.

35. The apparatus of claim 34 wherein the polar active compound is titanium dioxide.

36. The apparatus of claim 34 wherein the polar spacer compound is calcium magnesium silicate.

37. The apparatus of claim 22 wherein said screen is a double screen comprising an outside screen having one face toward the exterior of said hopper, an inside screen having one face toward the interior of said hopper and its other face flush with the other face of the outside screen, and wherein at least the inside screen is coated with the mixture of materials and at least one substantially transparent resin coating to cover the mixture of materials.

* * * * *